United States Patent [19]
Laude

[11] Patent Number: 6,157,764
[45] Date of Patent: Dec. 5, 2000

[54] OPTIC FIBER WAVELENGTH MULTIPLEXER-DEMULTIPLEXER

[75] Inventor: Jean-Pierre Laude, Saint Cyr la Rivière, France

[73] Assignee: Instruments S.A., Paris, France

[21] Appl. No.: 09/044,189

[22] Filed: Mar. 19, 1998

[30] Foreign Application Priority Data

Mar. 28, 1997 [FR] France .................................. 97 03877

[51] Int. Cl.$^7$ ...................................................... G02B 6/02
[52] U.S. Cl. .......................................................... 385/127
[58] Field of Search ................................. 385/126, 127, 385/123, 137, 147

[56] References Cited

U.S. PATENT DOCUMENTS

| | | | |
|---|---|---|---|
| 4,622,662 | 11/1986 | Laude et al. ............................... | 370/3 |
| 5,278,931 | 1/1994 | Antos et al. ............................. | 385/126 |
| 5,473,719 | 12/1995 | Stone ....................................... | 385/123 |
| 5,613,027 | 3/1997 | Bhagavatula ............................ | 385/123 |

FOREIGN PATENT DOCUMENTS

| | | |
|---|---|---|
| 0 689 068 | 12/1995 | European Pat. Off. . |
| 0 749 024 | 12/1996 | European Pat. Off. . |
| 2 325 059 | 4/1977 | France . |

OTHER PUBLICATIONS

W. A. Reed et al: "Tailoring Optical Characteristics of Dispersion–Shifted Lightguides for Applications Near 1.55 $\mu$m", AT&T Technical Journal, vol. 65, No. 5, Sep., 1986, pp. 105–122.

M. Ohashi et al: "Mode Field Diameter Measurement Conditions in Single–Mode Fibres", Electronics Letters, vol. 25, No. 8, Apr. 13, 1989, pp. 493–495.

*Primary Examiner*—Akm E. Ullah
*Attorney, Agent, or Firm*—Arent Fox Kintner Plotkin, PLLC

[57] ABSTRACT

A multiplexer, demultiplexer or router includes an input fiber and an output fiber, each fiber having a core and a sheath. At least one of the input fiber and the output fiber includes an intermediate ring having an optic index greater than the optic indexes of immediately adjacent portions of the core and the optic sheath and less than the optic index of the center axis of the core.

6 Claims, 4 Drawing Sheets

OPTIC FIBER WAVELENGTH MULTIPLEXER-DEMULTIPLEXER

BACKGROUND OF THE INVENTION

This invention relates to an optic fiber wavelength multiplexer-demultiplexer, liable to be used as a component in optic fiber teletransmission installations.

We already know such multiplexers-demultiplexers which have been described, then gradually perfected, in particular in the French patents FR-2.543.768, FR-2.519.148, FR-2.479.981, FR-2.496.260 and in the European patent EP-0.196.963.

With optic fiber multiplexer-demultiplexer, we mean devices in which the input and output luminous waves are propagated by optic fibers.

The invention also relates to optic fiber routers in which a variable number of input fluxes, each of a particular wavelength, propagated by spacially distinct optic fibers, are directed to a possibly different number of output fibers.

In these various devices, a dispersing system plays the coupling role, for a given wavelength between an output fiber and an input fiber.

A channel is therefore defined with, of course, a certain spectral width $\Delta\lambda$.

The performing multiplexers-demultiplexers or routers must simultaneously enable operation of a large number of channels, each of these channels, centered on a wavelength $\lambda$, must exhibit a spectral width $\Delta\lambda$ as broad as possible, while avoiding any crosstalk.

There is a crosstalk when a portion of the energy generated from a channel is partially mixed to the energy of an adjacent channel. Crosstalk is well-known to disturb communications and the devices exhibiting an excessive level of crosstalk are useless in practice.

To simplify the description, the device according to the invention will be denominated a multiplexer-demultiplexer, whereas we may be dealing with a multiplexer, a demultiplexer or a router.

The purpose of the invention is therefore to suggest a multiplexer-demultiplexer offering improved properties and, while preserving adequate separation of the channels, enhancing the spectral width of each of them.

In order to reach this target, it has been suggested, according to the invention, to implement input or output optic fibers, possibly input as well as output optic fibers, with index variations enabling to broaden the requested spectral width.

In this view, the invention relates to an optic fiber wavelength multiplexer-demultiplexer comprising a dispersing system, at least one input fiber and at least one output fiber, wherein the output fibers have a core and an optic sheath (cladding).

SUMMARY OF THE INVENTION

According to the invention, the output and/or input fibers contain an intermediate ring, arranged between the core and the optic sheath, wherein the optic index of the intermediate ring is greater than the optic index of the optic sheath.

According to different embodiments each exhibiting their own advantages:

the fibers comprise an insulating ring situated between the core and the intermediate ring, wherein the optic index of the insulating ring is smaller than that of the intermediate ring, the index variation of the core of the fibers, in relation to the radius, is linearly decreasing from the center, the index variation of the core of the fibers, in relation to the radius, from the core, is first linearly increasing, then linearly decreasing, the index variation of the core of the fibers, in relation to the radius, from the core, is first constant, equal to a value $n_1$, then constant at a value $n_2 > n_1$, the variation thus forming a ring, the index variation of the core of the fibers, in relation to the radius, from the core, forms several successive rings.

BRIEF DESCRIPTION OF THE DRAWINGS

The invention will be described in detail with reference to the appended drawings on which.

DETAILED DESCRIPTION OF THE PREFERRED EMBODIMENTS

Figure 1:
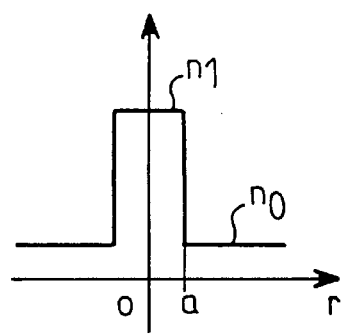
FIG. 1 represents the index profile of a monomode fiber used in network wavelength multiplexers according to the previous art.
Figure 2:
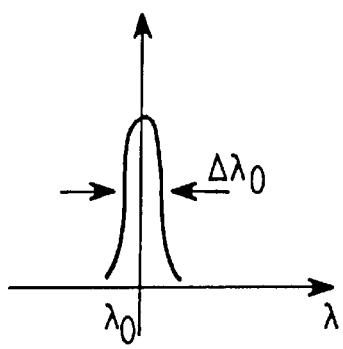
FIG. 2 represents the index profile of a channel obtained according to the previous art with an optic fiber of FIG. 1.
Figure 3:
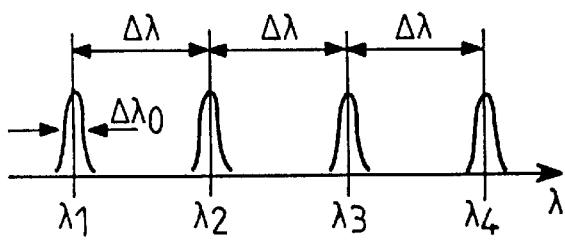
FIG. 3 represents the transfer function of a multiplexer of the previous art, performed with optic fibers of FIG. 1.

FIGS. 1 to 3 are designed for presenting the operation of transmission devices with a dispersing element of the previous art.

As the monomode fibers possess an index distribution from the centers 0 where the fiber core has an index $n_1$, and the optic sheath (or cladding) of the fiber has an index $n_0$.

We know that fibers with such an index profile, represented on FIG. 1, produce a wavelength transmission function between an input fiber and an output fiber separated from one another by a dispersing element, as represented on FIG. 2, with approximately a Gauss-curve shape centered on a wavelength $\lambda_0$ and with mid-height width $\Delta\lambda_0$.

In the case of a multiplexer or of a demultiplexer, several fibers, for example output fibers, being associated with an input fiber, the pass-band of the whole device, represented on FIG. 3, is made of a number of elementary pass-bands such as those represented on FIG. 2. The distance between the various center wavelengths $\lambda_1, \lambda_2, \ldots \lambda_n$ is limited by the mechanical neighbouring possibilities of the cores of the adjacent fibers, whereas this limitation is caused by the mechanical space requirements of the fiber consisting of its core, of its optic sheath (cladding) and of its mechanical sheath (coating).

Figure 4:
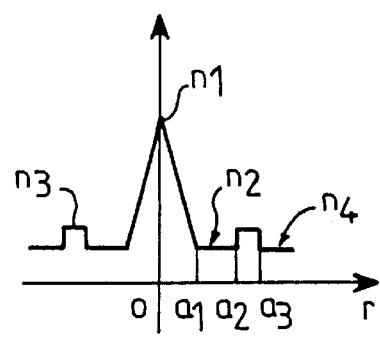
FIG. 4 represents a first example of index profile of a monomode optic fiber used according to the invention.

In a first embodiment of the invention, the index profile of the fiber in relation to its radius r is represented on FIG. 4. Starting from the center O, this index n is linearly decreasing from a value $n_1$ down to a value $n_2$ reached for a radius $a_1$, it has a constant value $n_2$ up to a radius $a_2$, then takes on a value $n_3$ constant between $a_2$ and $a_3$, and then a constant value $n_4$, index of the cladding.

Figure 5:
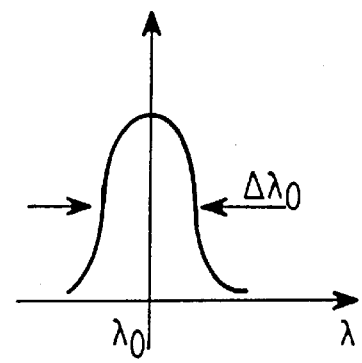
FIG. 5 represents the index profile of a channel obtained according to the invention, with an optic fiber of FIG. 4.

Such a fiber produces an elementary transfer function such as represented on FIG. 5, whose mid-height width $\Delta\lambda_0$ has vastly increased with respect to that of a traditional fiber such as represented on FIG. 2. It follows a transfer function for a multiplexer such as represented on FIG. 6, also improved with respect to that of the previous system represented on FIG. 3.

The values of these parameters are advantageously as follows:

n1=1.450
n2=1.444
n3=1.448
n4=1.444
a1=10.5 $\mu$m
a2=21 $\mu$m
a3=26 $\mu$m

As a rule, in this embodiment, the indices will be such as $$\frac{(n_1 - n_4)}{n_4}, \frac{(n_2 - n_4)}{n_4} \text{ and } \frac{(n_3 - n_4)}{n_4}$$

are each smaller than $2.10^{-3}$.

Figure 7:
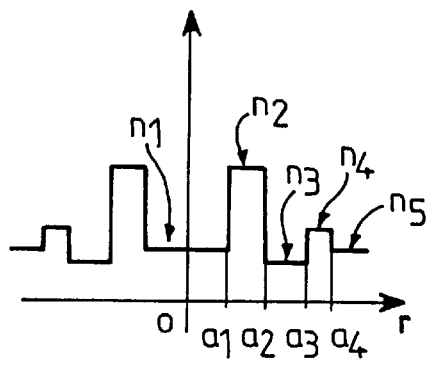
FIG. 7 represents a second example of index profile of a monomode optic fiber used according to the invention.

According to another embodiment, where the distribution of the index of the fiber is represented on FIG. 7, its value at the center $n_1$ is relatively small and it has this value up to a value $a_1$ of the radius, between the values $a_1$ and $a_2$ of the radius, the index is $n_2$, the index is again $n_1$ between $a_2$ and $a_3$ and shows a value $n_3$ between $a_3$ and $a_4$.

The values of these parameters are advantageously as follows:

n1=1.447
n2=1.451
n3=1.444
n4=1.448
n5=1.444
a1=12 $\mu$m
a2=14 $\mu$m
a3=22 $\mu$m
a4=27 $\mu$m

Figure 10:
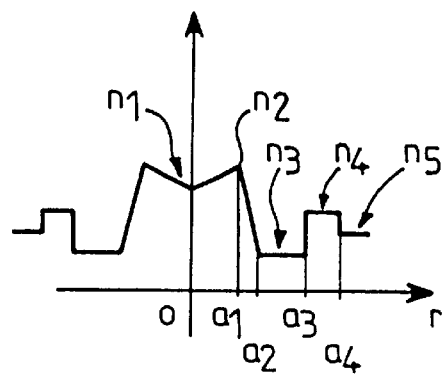
FIG. 10 represents a third example of index profile of a monomode optic fiber used according to the invention.
Figure 8:
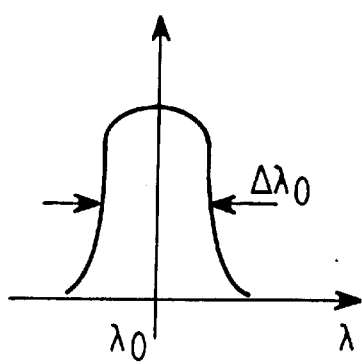
FIG. 8 represents the index profile of a channel obtained according to the invention, with an optic fiber of FIG. 7.
Figure 11:
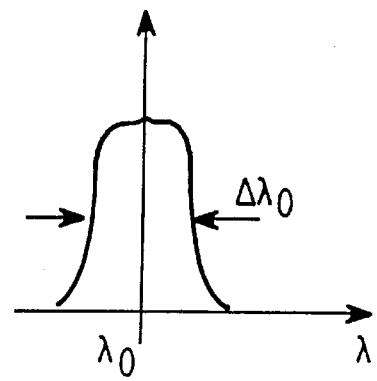
FIG. 11 represents the index profile of a channel obtained according to the invention, with an optic fiber of FIG. 10.

According to a third embodiment represented on FIG. 10, still starting from the center, the index first has a value $n_1$ at the center, increasing linearly and gradually up to a value $n_2$ reached for the radius $r=a_1$, the index is then equal to a value $n_3$, then the intermediate ring constituted between the radii $r=a_3$ and $r=a_4$ defines a ring in which the fiber index is $n_4$, the index of the optic sheath (cladding) is equal to $n_5$.

The values of these parameters are advantageously as follows:

n1=1.460
n2=1.464
n3=1.454
n4=1.444
a1=10 $\mu$m
a2=13 $\mu$m
a3=16 $\mu$m
a4=19 $\mu$m

Figure 16:
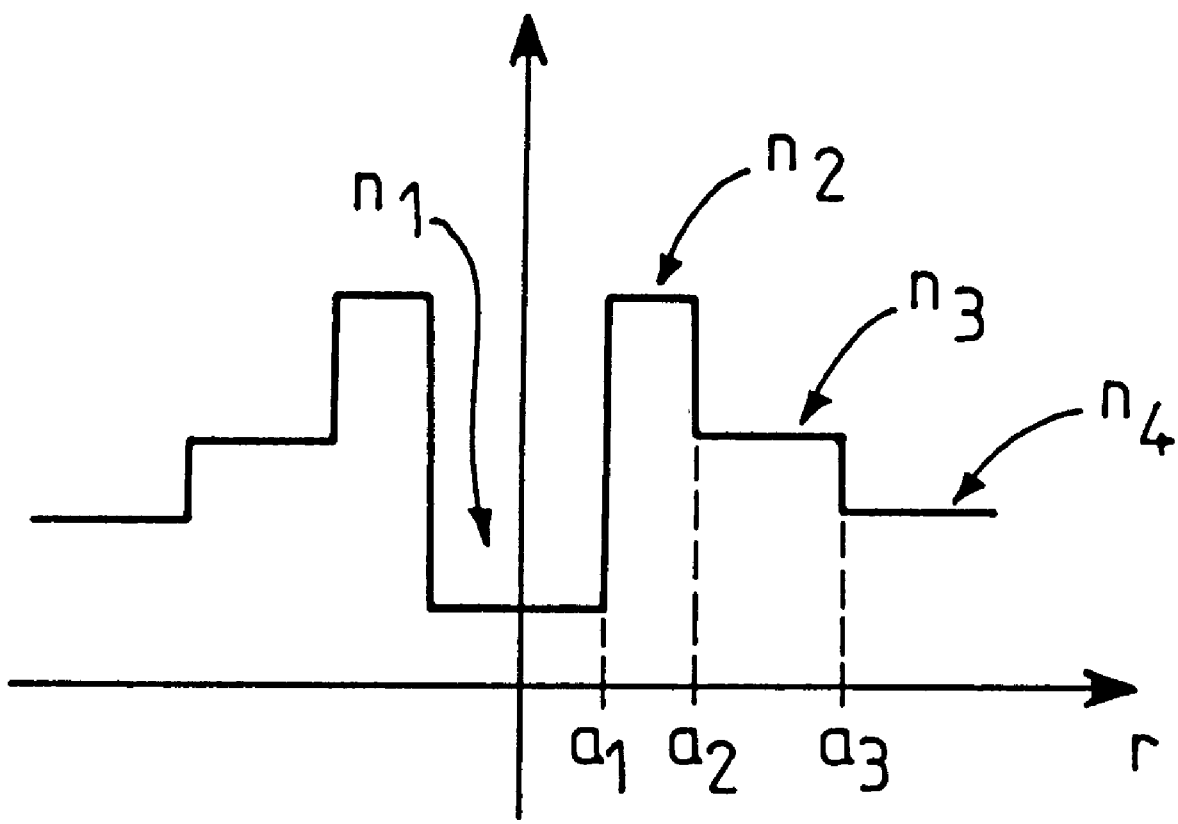
FIG. 16 represents a fourth example of index profile of a monomode optic fiber used according to the invention.

According to a fourth embodiment represented on FIG. 16, the value $n_1$ of the index at the center is relatively small and the index remains equal to $n_1$ up to a value $a_1$ of the radius. Between the values $a_1$ and $a_2$ of the radius, the index is $n_2$, then it becomes equal to $n_3$ between $a_2$ and $a_3$, then $n_4$ for a radius value above $a_3$. The values $n_2$, $n_3$ and $n_4$ are in decreasing order.

The various fibers can each be implemented in various multiplexer-demultiplexer devices.

Figure 13:
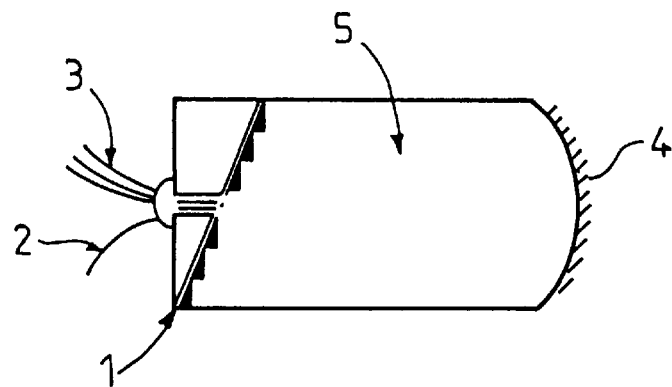
FIG. 13 is an example of a conventional network demultiplexer implementing the invention.

FIG. 13 represents an network device 1, whereas an input fiber 2 feeds the device with a multiplexed luminous flux and an output fiber comb 3 provides differentiated fluxes for each wavelength.

The ends of these fibers 3 are placed in the center of the network 1, itself more or less at the focal point of a concave mirror 4. The space 5 between the network 1 and the mirror 4 can accommodate different optic components enabling, according to the requirements, to improve the properties of the system.

Figure 6:
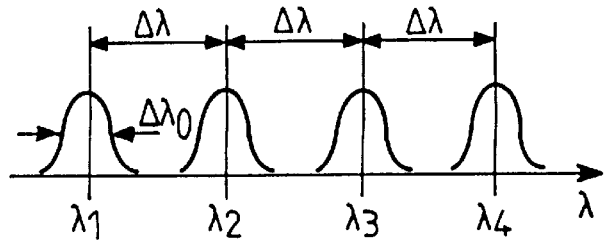
FIG. 6 represents the transfer function of a multiplexer according to the invention, performed with optic fibers of FIG. 4.
Figure 9:
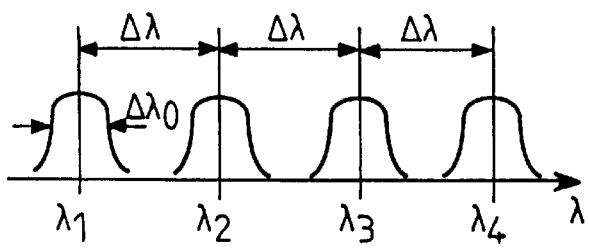
FIG. 9 represents the transfer function of a multiplexer according to the invention, performed with optic fibers of FIG. 7.
Figure 12:
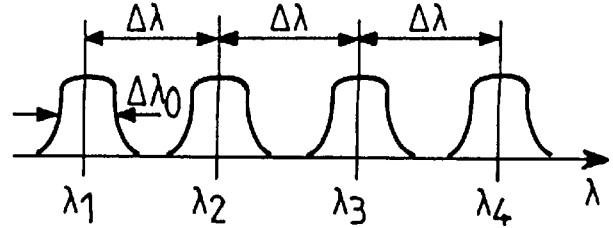
FIG. 12 represents the transfer function of a multiplexer according to the invention, performed with optic fibers of FIG. 10.

In such a device, profiles of each fiber of the fiber comb 3 corresponding to those described above and represented on FIGS. 4, 7 and 10, provide this demultiplexer with the transfer functions represented on FIGS. 6, 9 and 12.

Figure 14:
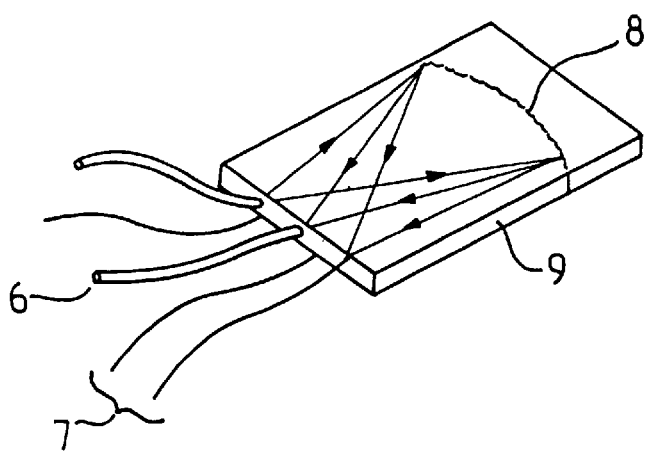
FIG. 14 is an example of integrated network multiplexer on a silicium substrate implementing the invention.

The dispersing element of the multiplexer-demultiplexer according to the invention can also be an integrated optic network such as represented on FIG. 14.

An input fiber 6 and an output fiber comb 7 are coupled to the integrated network 8 carried by a silicium substrate 9.

Here again, the index profiles of the fibers represented on FIGS. 4, 7 and 10 provide the transfer functions described above.

Figure 15:
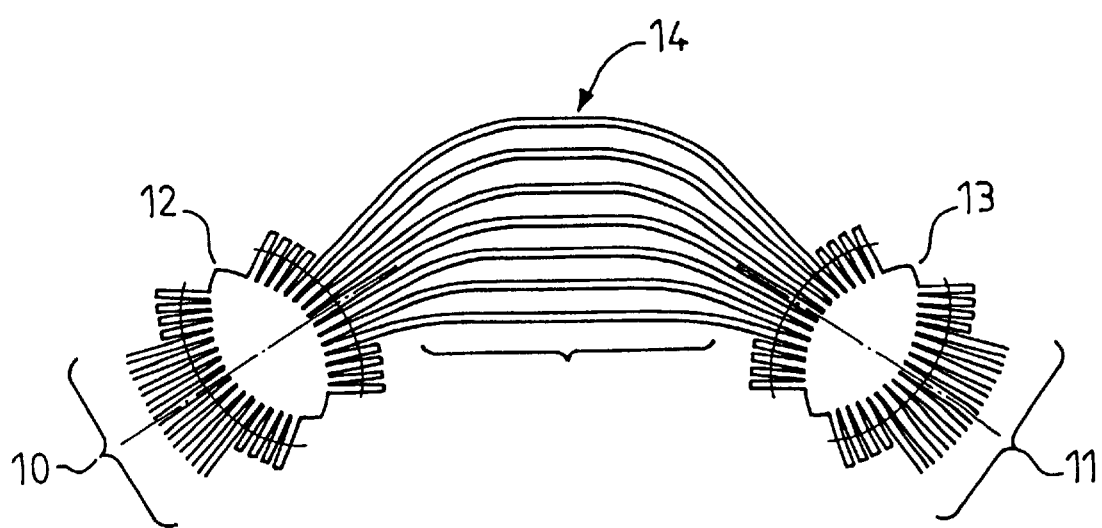
FIG. 15 is an example of integrated multiplexer implementing the invention.

The invention is again implemented in the integrated multiplexer or router n×n such as represented on FIG. 15, in which input fibers 10 feed an input star switch 12 connected to an output star switch 13, itself associated with a set of output fibers 11, via an integrated optic network 14.

Here again, the index profiles of the fibers represented on FIGS. 4, 7 and 10 provide the transfer functions described above.

Generally speaking, various index profiles of fiber can enable the implementation of the invention. The theory of luminous waves propagation in monomode fibers, presented by J. P LAUDE in his book « Le multiplexage de longueur d'onde-Wavelength multiplexing Masson » (publishing house), 1992 (ISBN 2-225-82755-9), gives the references of several scientific articles written by different authors which enable for a given profile, to calculate the equivalent radius of the fiber. The higher the equivalent radius/actual radius ratio, the better the performances of the multiplexers-demultiplexers.

What is claimed is:

1. An apparatus comprising:

an optic fiber wavelength device including a dispersing system, at least one input fiber and at least one output fiber;

wherein each of said fibers includes a core and an optic sheath;

wherein at least one of the input and output fibers includes an intermediate ring positioned between the core and the optic sheath, the intermediate ring having an optic index greater than optic indexes of immediately adjacent portions of the core and the optic sheath and less than the optic index of the center axis of the core; and wherein the optic fiber wavelength device is one of a multiplexer, demultiplexer and a router.

2. An apparatus according to claim 1 wherein said at least one of the input and output fibers further comprises an insulating ring situated between the core and the intermediate ring, wherein the optic index of the insulating ring is smaller than the optic index of the intermediate ring.

3. An apparatus according to any of claims 1 or 2, wherein the index variation of the core of the output fibers, in relation to the radius, is linearly decreasing from the center.

4. An apparatus according to any of claims 1 or 2, wherein the index variation of the core of the output fibers, in relation to the radius, from the core, is first linearly increasing, then linearly decreasing.

5. An apparatus according to one of claims 1 or 2, wherein the index variation of the core of the output fibers, in relation to the radius, from the core, is first constant, equal to a value $n_1$, then constant at a value $n_2 > n_1$, the variation thus forming a ring.

6. An apparatus according to claim 5 wherein the index variation of the core of the output fibers, in relation to the radius, from the core, forms several successive rings.

* * * * *